April 6, 1965        G. TOKAR        3,176,600
CAM CONTROLLED DIAPHRAGM AND FOCUS COACTION
Filed June 6, 1962
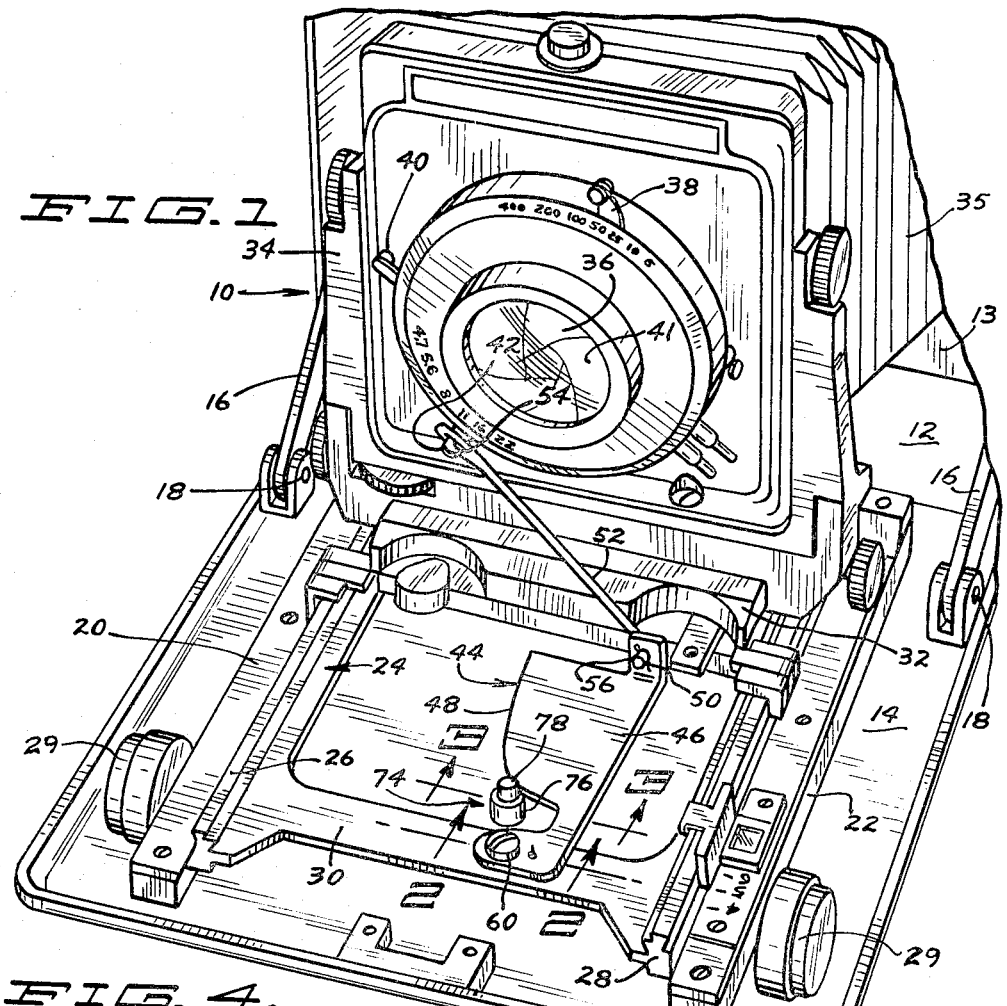
INVENTOR.
GEORGE TOKAR
BY
Carlsen and Carlsen
ATTORNEYS

United States Patent Office 3,176,600
Patented Apr. 6, 1965

3,176,600
CAM CONTROLLED DIAPHRAGM AND
FOCUS COACTION
George Tokar, 57 Russell Ave. S., Minneapolis, Minn.
Filed June 6, 1962, Ser. No. 200,466
8 Claims. (Cl. 95—64)

This invention relates to photographic equipment and more particularly to diaphragm controls for cameras and to a method for making such controls.

Several diaphragm control devices have been previously proposed for adjusting the diaphragm setting of a camera having an artificial source of illumination mounted thereon in correspondence with changes in the focal setting thereof. The purpose of these devices is to provide a substantially constant plate exposure regardless of the distance of the camera and lamp from the object being photographed. By providing such a control, it will be readily understood that a substantial amount of time can be saved in taking each photograph. In a conventional camera it is necessary to both focus the camera and adjust the diaphragm or stop before a picture is taken, whereas with the control of the class described it is only necessary to focus the camera and the f stop will be automatically adjusted at the same time. In this way it is possible to accommodate for differences in the illumination of the subject as the camera and flash bulb or other luminating means are moved closer or further away from the subject.

These prior diaphragm controls have been relatively complicated in construction and to some extent ineffective in operation. Some have been suitable for operation only with a type of iris diaphragm which is not widely used. Others occupy considerable amount of space in the area adjacent the camera lens and therefore tend to be in the way of the user. Most of the prior diaphragm controls employ a large number of parts which not only make the apparatus expensive but also produce a substantial amount of mechanical friction. Furthermore, to install many of the prior diaphragm controls, it is necessary to either completely or partially dismantle the camera. Another shortcoming found in many proposed diaphragm controls results from the fact that the control is designed to adjust the diaphragm for only a single variable, as for example, the change of illumination as a function of the square of the distance of the lamp from the subject.

In view of the deficiencies of the prior art, it is thus one object of the present invention to provide an improved diaphragm control for a camera which employs a relatively small number of parts and occupies a minimum amount of space so as to be out of the way of the user.

It is yet another object of the present invention to provide an improved control for a camera which will reliably adjust the iris diaphragm setting in accordance with the focal setting of the camera over the full range of focal and diaphragm settings with a minimum amount of friction.

It is still another object of the present invention to provide an improved camera diaphragm control of the class described which can be easily installed on a camera without taking the camera apart.

It is yet another object of the present invention to provide an improved diaphragm control for cameras having an illuminating lamp mounted thereon which will accommodate for differences in light at different focal settings as well as for the change in the bellows draw and other factors which will affect the exposure of the emulsion as the distance of the camera from the subject, bellows draw and diaphragm settings are changed.

It is yet another object of the present invention to provide an improved iris diaphragm control including means for quickly and easily changing relationship between the focal setting and the diaphragm setting so as to accommodate for the changes in the subject and the type of film being used.

These and other more detailed and specific objects will be disclosed in the course of the following specification, reference being had to the accompanying drawings, in which—

FIG. 1 is a partial perspective view of a camera embodying the present invention.

FIG. 2 is a partial vertical sectional view taken along line 2—2 of FIG. 1.

FIG. 3 is a partial vertical sectional view taken on line 3—3 of FIG. 1.

FIG. 4 is a partial plan view of a camera embodying a modified form of the present invention.

Briefly stated, the present invention provides a diaphragm control for a camera having a slide carrier with a carriage and a lens board movably mounted thereon. The control includes an actuating assembly having a cam member mounted adjacent the slide carrier and a cam follower operatively associated with the cam member. A linkage means is connected to the actuator assembly at one end thereof and to the iris diaphragm operating lever at the other end thereof. Specifically the cam member is pivotally mounted upon the carriage and the linkage member extends from the cam mmeber to the diaphragm operating lever. A resilient member is provided for yieldably biasing the cam member against the cam follower. Means are provided for rendering the control assembly inoperative when it is desired to adjust the diaphragm manually. Means are also provided for enabling the camming surface of the cam to be changed to suit different operating circumstances.

Referring now to the drawings, there is shown in FIGS. 1, 2 and 3 a camera 10 of the type commonly referred to as a press camera including a main framework 12, a plate holder 13 and a slide carrier 14 which also functions as a cover for enclosing the camera when the camera is collapsed. The slide carrier is supported during operation in a normally horizontally disposed plane as shown in FIG. 1 by a pair of links 16 of suitable known construction which are pivotally connected at their lower ends by means of pivot 18 to the slide carrier 14. Rigidly mounted upon the upper surface of the slide carrier 14 are a pair of laterally spaced apart parallel guideways 20 and 22. A carrier indicated generally at 24 is slidably mounted upon the guideways 20 and 22 for movement thereon along an axis extending parallel to the optical axis of the camera. Movement of the carriage 24 upon guideways 20 and 22 functions to focus the camera.

The carriage 24 includes the usual guides 26 and 28 which are slidably associated with the guideways 20 and 22 respectively. A focusing knob 29 is provided for moving the carriage 24 on the slide carrier 14 conventionally. Extending between the forward ends of the guides 26 and 28 is a cross member 30 and extending between the guides at their rearward ends is a cross member 32. Rigidly mounted upon the cross member 32 and extending upwardly therefrom is a lens board 34 upon which is mounted a lens 36.

The duration of exposure is controlled by the usual exposure control arm 38 and the shutter is operated by means of a control arm 40. The camera also includes an iris diaphragm 41, only a part of which is shown. The diaphragm 41 is adjusted by means of a lever 42 which bends forwardly from beneath the lens 36 and is mounted for movement along an arc having the optical axis of the lens as its approximate center. Movement of the control lever 42 downwardly and toward the right in FIG. 1 will cause the iris diaphragm 41 to be stopped down while movement thereof in the opposite direction will cause the opening of the iris diaphragm 41 to be increased.

Mounted below the lens board 34 and forwardly thereof is a diaphragm actuator or control assembly indicated generally at 44. The diaphragm control assembly 44 includes a cam member in the form of a horizontally disposed plate 46 having a curved camming surface 48 upon the left side thereof as viewed in FIG. 1. The camming surface 48 is convex and has a generally hyperbolic curvature with a relatively straight portion along the rearward end thereof and a relatively sharply curved portion near the forward end thereof as seen in FIG. 1.

The cam member 46 is provided with an upwardly extending tab 50 at its rearward end. A connecting means such as a link 52 is connected between the tab 50 and the control lever 42. To this end, the link 52 is provided with a longitudinally extending slot 54 at its upper end adapted to fit frictionally over the outer end of the lever 42. The lower end of the link 52 bends forwardly, extends through a suitable opening in the tab 50 and is provided with a head 56 which securely retains the lower end thereof upon the tab 50. The portion of link 52 which passes through the tab 50 should fit relatively loosely therein so as to comprise a generally universal pivotal mounting for the link, thereby enabling the link to swing about a vertical axis as well as about a horizontal axis.

At its forward end, the cam member 46 is pivotally mounted upon the cross member 30 by means of a pivot pin in the form of a screw 60. The screw 60 is provided with a center portion 62 which extends through an opening in the cam member 46 as best seen in FIG. 2. The portion 62 is of a greater height than the thickness of the member 46 to accommodate a spacer 64 positioned between the cross member 30 and the cam member 46. The screw 60 is threaded at 66 into the cross member 30. Positioned between the cross member 30 and the cam member 46 and encircling the spacer 64 is a torsion spring 68, one end of which is secured at 70 to the member 46 and the other end of which is secured at 72 to the cross member 30. When the cam member 46 is in position for operation, the torsion spring 68 should be under tension and exerting torque upon the cam member 46 about the screw 60 in a counterclockwise direction as seen in FIG. 1.

The diaphragm control assembly 44 also includes a cam follower indicated generally at 74 and threaded at 79 into the slide carrier 14. The cam follower 74 includes a base 76 which is provided with a vertically extending bore 77. Within bore 77 is slidably mounted a vertically extending post 78. A detent 80 is mounted within the wall of the base 76 to releasably retain the post 78 in an elevated position as shown in solid lines in FIG. 3, with the upper end thereof abutting against the camming surface 48. When it is desired to render the diaphragm control inoperative so that the diaphragm 41 can be manually adjusted, the post 78 can be depressed to the dotted line position of FIG. 3 thereby disengaging the post 78 from the cam member 46.

If desired, the diaphragm control assembly can in the alternative be rendered inoperative by manually disengaging the upper end of link 52 from the lever 42. If this practice is employed, the follower 74 can be formed from a single piece rigidly connected to support 14.

In FIG. 4 there is shown a modified form of the invention which is similar in all respects to the form of the invention described hereinabove except for the cam member which will now be described.

The cam member of FIG. 4 is indicated at 82 and includes an elongated support member 84 which is pivotally mounted at its forward end to the cross member 30 by means of a pivot in the form of a screw 86, which in all respects is similar to screw 60. At its rearward end the member 84 is provided with an upwardly extending tab 87 which is pivotally secured at 88 to the link 52. Mounted upon the support member 84 is a cam member 90 including a convex camming surface 92 having a generally hyperbolic curvature including a relatively straight portion 93 at its rearward end and a sharply curved portion 93 near the forward end thereof. The cam member 90 also includes a rearwardly and downwardly projecting tab 94 which projects into a transverse slot 96 at the rearward end of the cam support member 84. The forward end of the cam member 90 is secured rigidly to the member 94 by means of a fastener such as screw 98. A number of cam members similar to the cam member 90 can be provided, each with a camming surface 92 of a somewhat different curvature so as to provide various camming characteristics which will accomodate for different exposure requirements of several types of films and for different subjects. Thus, as an example, when a black and white film is being used, a cam member 90 having a cam surface 92 of a particular curvature will be desired but when a colored film is employed, a cam member having a different curvature may be desired. The cam member 90 can be quickly and easily changed simply my removing the screw 98 and withdrawing the tab 94 from the slot 96 and then inserting the tab 94 of a new cam member 90 into the slot 96 and replacing the screw 98.

During operation of a camera employing the present invention, a suitable lamp (not shown) for supplying artificial illumination will be affixed to the camera as described above. To take a picture, the user merely adjusts the exposure control lever 38 to the setting required for the particular flash lamp and cam 46 which are being employed. This setting should then remain unchanged. Next the camera is focused by turning the focusing knobs 29. As the knobs 29 are turned in a direction adapted to move the carriage 24 forwardly on the slide carrier 14 for focusing upon a subject closer to the camera, the engagement between the post 78 and the cam surface 48 will cause the rearward end of the cam member 46 and link 52 to swing toward the right, as seen in FIG. 1, thereby reducing the opening of the iris diaphragm 41. When the carriage 24 is moved in the opposite direction, the rearward end of the cam member 46 and the link 52 will swing toward the left, as seen in FIG. 1, thereby opening the iris diaphragm 41 and in this way automatically setting the iris diaphragm to compensate for differences in the illumination upon the subject as well as for differences in the bellows draw and other factors which change as a function of these variables. It will thus be understood that the photographs can be taken much more rapidly and conveniently with a camera embodying my invention than with a conventional camera since no separate adjustment of the iris diaphragm need be made. Moreover, the accuracy of the iris diaphragm setting is maintained at all times, thereby eliminating an occasional poorly exposed negative.

According to my invention the curvature of the camming surface 48 is established in the following manner. A blank cam member 46 is mounted first upon the camera as shown in FIG. 1 with the link 52 in place. At this stage in the operation, the blank cam member 46 will be larger than the completed cam member shown in the drawings and portions thereof will extend to the left in FIG. 1 substantially beyond the camming surface 48. A suitable marking member such as a pin (not shown) is secured to the carrier 14 in place of the cam engaging member 74 with the pointed end thereof in the position occupied by the part of the post 78 which contacts the cam 46. With an artificial source of illumination of the type to be used later for taking photographs mounted upon the camera 10, the camera is focused upon subjects at different distances therefrom and at each distance the iris diaphragm control lever 42 is adjusted manually so that a light meter placed in the positon of the film holder 13 of the camera 10 will give the same reading at each focal setting. Each time the control lever 42 is positioned to give the correct reading on the meter, a mark is made on the cam blank by pressing the cam blank upon the upper end of the marking member. After a number of these marks have been made upon the lower surface of the blank cam, it can be removed and then cut along a curved line joining these marks. The cam thus formed can either be placed upon a camera or used as a pattern for forming additional cam members.

An important advantage of the method employed forming the cam 46 as descirbed hereinabove derives from the fact that the cam thus formed will accommodate for differences in illumination due to the change in lighting as a function of the square of the distance from the subject as well as for differences in the exposure of the emulsion due to changes in bellows draw and even the particular characteristics of the lens. Furthermore, the differences in the lengths of the lever arms during movement of the cam member 46 are also accommodated for when the curvature of the camming surface 48 is established. Thus, even though the tab 50 swings in an arc and although the distance between the cam follower 74 and pivot 86 changes continuously during operation, the diaphragm will be properly adjusted at all focal settings.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In an iris diaphragm control for a camera having a slide carrier, a lens supporting member movably mounted theron, an iris diaphragm and an iris diaphragm control lever, said control comprising in combination, a cam member pivotally mounted upon said supporting member for pivotal movement about a vertical axis positioned forwardly of said lens, said cam member including a convex camming surface on one side thereof having a generally hyperbolic curvature with a relatively straight portion along the rearward aspect thereof and a relatively sharply curved portion near the forward end thereof, a cam follower member rigidly mounted upon said slide carrier and extending upwardly therefrom, a portion of said cam follower being adapted to slidably engage said camming surface, a resilient means operatively associated with said cam member for urging said cam member into engagement with said cam follower and means connecting the rearward end of said cam member with said control lever.

2. The subject matter of claim 1 in which the means connecting the rearward end of the cam member is comprised of a single member pivotally mounted on the cam member at one end and adapted to engage an iris diaphragm control lever at the other end.

3. In a camera having a support member, a carriage movably mounted thereon, a lens board connected to said carriage, an iris diaphragm and an iris diaphragm operating lever connected thereto, the combination of a diaphragm control including a cam member pivotally connected at one end thereof to said carriage for pivotal movement about a vertical axis, said cam member having an arcuate caming surface with a generally hyperbolic curvature including a relatively straight portion at one end thereof and a relatively sharply curved portion at the other end thereof, a link means connected at one end to a portion of said cam member spaced from the end thereof connected to said carriage and at the other end thereof connected to said operating lever, a cam follower member rigidly connected to said support member, a portion of said follower being adapted to engage said camming surface and a resilient member for yieldably biasing said cam member into engagement with said cam follower, said iris diaphragm being thereby moved toward the closed position as said carriage and said lens board move forwardly upon said support member.

4. The apparatus according to claim 2 wherein said cam follower comprises a base member, a post movably mounted thereon, and means for releasably securing said post in a first position wherein a portion thereof is adopted to engage said camming surface and said post being movable to a second position out of engagement with said caming surface.

5. The apparatus according to claim 2 wherein said cam member includes a support element and a camming element removably mounted thereon.

6. The method of forming a cam for adjusting the diaphragm setting of a camera having a slide carrier, a lamp mounted thereon, a photographic film supporting stage, a carriage, a diaphragm and a control lever therefor, the steps of pivotally mounting a blank cam upon said carriage, operatively connecting said blank cam to said lever, mounting a marking member upon said slide carrier in a position adapted to engage said blank cam, focusing said camera upon subjects at different distances from said camera and at each focal setting adjusting said control lever to provide the same illumination upon said stage, causing said cam member to produce a mark upon said blank cam at each setting of said control lever and thereafter forming a cam surface upon said blank cam along the line connecting the marks thus made upon said cam.

7. The method according to claim 6 wherein a cam member thus formed is thereafter used as a pattern for forming additional cam members.

8. An iris diaphragm control for a camera having a slide carrier, a carriage movably mounted thereon, a lens board affixed to said carriage, and a diaphragm, said control comprising in combination an actuator assembly including a cam member extending generally longitudinally of, and positioned adjacent said slide carrier, said cam member having an arcuate camming surface thereon, a cam follower member positioned adjacent said cam member and operatively associated therewith to engage said camming surface, said cam member being pivotally mounted upon the forward end of said carriage in the plane of movement of said carriage and said slide member and said carriage, said cam follower being affixed to said slide carrier, and a link member pivotally connected at one end to the rearward end of said cam member and operatively connected at the other end thereof to said diaphragm.

References Cited by the Examiner
UNITED STATES PATENTS

| 2,351,834 | 6/44 | Phillips | 95—64 |
| 2,369,199 | 2/45 | Aiken | 95—64 |
| 2,549,230 | 4/51 | Parody | 95—64 |

EVON C. BLUNK, *Primary Examiner.*

EMIL G. ANDERSON, NORTON ANSHER,
*Examiners.*